(12) United States Patent
Von Fragstein et al.

(10) Patent No.: US 11,371,614 B2
(45) Date of Patent: Jun. 28, 2022

(54) PLASMA-COATED SEALING ELEMENT

(71) Applicant: Carl Freudenberg KG, Weinheim (DE)

(72) Inventors: Friederike Von Fragstein, Heidelberg (DE); Matthias Adler, Heppenheim (DE); Stephan Rutz, Weinheim (DE); Thomas Schnetz, Schwetzingen (DE); Katharina Hallstein, Fuerth/Kroeckelbach (DE); Kai Feller, Birkenau (DE); Boris Traber, Hirschberg (DE); Erich Prem, Hemsbach (DE)

(73) Assignee: CARL FREUDENBERG KG, Weinheim (DE)

( * ) Notice: Subject to any disclaimer, the term of this patent is extended or adjusted under 35 U.S.C. 154(b) by 115 days.

(21) Appl. No.: 16/611,490

(22) PCT Filed: Apr. 18, 2018

(86) PCT No.: PCT/EP2018/059835
§ 371 (c)(1),
(2) Date: Nov. 7, 2019

(87) PCT Pub. No.: WO2018/206248
PCT Pub. Date: Nov. 15, 2018

(65) Prior Publication Data
US 2021/0148466 A1   May 20, 2021

(30) Foreign Application Priority Data
May 8, 2017   (EP) .................................... 17169930

(51) Int. Cl.
*F16J 15/3284*   (2016.01)
*B05D 1/00*   (2006.01)
*C08J 7/12*   (2006.01)

(52) U.S. Cl.
CPC ............ *F16J 15/3284* (2013.01); *B05D 1/62* (2013.01); *C08J 7/123* (2013.01)

(58) Field of Classification Search
CPC .......... F16J 15/3284; B05D 1/62; C08J 7/123
See application file for complete search history.

(56) References Cited

U.S. PATENT DOCUMENTS 2,538,198 A * 1/1951 Hosford ................. F16J 15/328
  277/572
3,167,323 A * 1/1965 Appleton ............. F16J 15/3204
  277/560

(Continued)

FOREIGN PATENT DOCUMENTS

CN       1882796 A    12/2006
CN     101031669 A     9/2007
(Continued)

OTHER PUBLICATIONS

Jacoby, et al. "Abscheidung, Charakterisierung und Anwendung von Plasma-Polymerschichten auf HMDSO-Basis" *Vakuum in Forschung und Praxis* 18, 4: 12-18 (Jan. 1, 2006). XP055330192.

*Primary Examiner* — Eugene G Byrd
(74) *Attorney, Agent, or Firm* — Leydig, Voit & Mayer, Ltd.

(57) ABSTRACT

A method includes using a sealing element to dynamically seal a sealing body in the presence of a lubricant. The sealing element has an elastomeric base body and a plasma coating. The coating includes the elements carbon, oxygen, silicon, and hydrogen. The coating has the following properties at least at the surface: the amount ratio C:Si (at %/at %) is >5, the amount ratio O:Si (at %/at %) is >3, and the surface energy is <50 mN/m. In an embodiment, the coating includes the element fluorine.

20 Claims, 2 Drawing Sheets

(56) References Cited

U.S. PATENT DOCUMENTS

| | | | |
|---|---|---|---|
| 3,814,447 A | 6/1974 | Hausmann | |
| 4,141,563 A * | 2/1979 | Wu | F16J 15/3284 277/556 |
| 4,265,458 A * | 5/1981 | Wheeler | B66B 11/0446 277/560 |
| 4,526,385 A * | 7/1985 | Wheeler | F16J 15/3208 277/556 |
| 4,579,352 A * | 4/1986 | Adang | F16J 15/3204 277/573 |
| 5,136,781 A * | 8/1992 | Stoll | F16J 15/3208 29/888.3 |
| 7,157,145 B2 * | 1/2007 | Vissing | B05D 1/62 427/452 |
| 8,173,522 B2 * | 5/2012 | Jakob | H01L 21/6836 438/460 |
| 8,251,373 B2 * | 8/2012 | Lev | H01M 8/04201 277/647 |
| 9,638,327 B1 * | 5/2017 | Banowetz | F16J 15/3236 |
| 2001/0051237 A1 * | 12/2001 | Gust | C09K 3/1009 428/34.1 |
| 2003/0057656 A1 * | 3/2003 | Gorman | F16J 15/3236 277/549 |
| 2007/0098978 A1 | 5/2007 | Tanaka et al. | |
| 2008/0095954 A1 | 4/2008 | Gabelnick et al. | |
| 2010/0166582 A1 * | 7/2010 | Racicot | F16J 15/3236 417/437 |
| 2011/0148050 A1 * | 6/2011 | Vissing | C08J 7/123 277/650 |
| 2012/0149616 A1 | 6/2012 | Kilthau et al. | |
| 2016/0018002 A1 * | 1/2016 | Lenhert | F16J 15/3212 277/540 |
| 2017/0030468 A1 * | 2/2017 | Badrossamay | F16J 15/3284 |
| 2020/0340587 A1 * | 10/2020 | Slagell | F16J 15/3276 |

FOREIGN PATENT DOCUMENTS

| | | | |
|---|---|---|---|
| DE | 102005025253 A1 | 12/2006 | |
| DE | 102009046947 A1 | 5/2011 | |
| DE | 102012010603 B4 | 11/2013 | |
| EP | 2291439 B1 | 10/2013 | |
| EP | 2473587 B1 | 10/2015 | |
| JP | 2004137507 A | 5/2004 | |
| WO | WO-2007118905 A1 * | 10/2007 | B01D 69/02 |

* cited by examiner

PLASMA-COATED SEALING ELEMENT

CROSS-REFERENCE TO RELATED APPLICATIONS

This application is a U.S. National Phase Entry under 35 U.S.C. § 371 of International Application No. PCT/EP2018/059835, filed on Apr. 18, 2018, and claims priority to European Patent Application No. EP 17169930.9, filed on May 8, 2017. The International Application, which is hereby incorporated by reference herein, was published in German on Nov. 15, 2018 as WO 2018/206248 under PCT Article 21(2).

FIELD

The present invention relates to the use of a sealing element for dynamically sealing a sealing body in the presence of a lubricant. The sealing element can have an elastomeric base body and a plasma coating. The present invention also relates to sealing systems, sealing methods, sealing elements and methods for the production thereof.

BACKGROUND

In the field of sealing technology, moving machine parts in assemblies are sealed with suitable sealing elements (sealing articles). In the case of dynamic seals, a movement of the sealing body to be sealed relative to a sealing element takes place. Examples of dynamic seals include mechanical seals, radial shaft sealing rings, labyrinth shaft seals, rod seals, O-rings, and piston rings. The moving interface in dynamic seals is referred to as a sealing gap. The sealing element adjoins a machine part, such as a shaft, piston or rod. The dynamic seals may contain lubricants. These lubricants serve for lubricating moving machine components in the assembly (e.g. transmission).

In this case, the lubricant can penetrate into the sealing gap. Sealing elements often consist of polymeric materials, such as thermoplastics or elastomers. The flexibility of such elastomers allows the sealing elements to be adapted to the sealing body during assembly and during operation.

In movable sealing systems, considerable forces act on the sealing elements which, because of the relatively low hardness of elastomers, cause sealing elements to wear out as a result of abrasion. Sealing elements therefore often have a limited service life and must be replaced on a regular basis. In order to improve stability, the hardest possible elastomers which are generally reinforced with fillers are used in the prior art. However, this has the disadvantage that although wear of the sealing elements can be reduced, the sealing body is worn out by abrasion at the same time. This effect, which in practice occurs even in the case of sealing bodies made of steel, is referred to as shaft shrinkage if the counter-rotating partner of the sealing element is a shaft.

In dynamic seals, the lubricant of the assembly to be sealed can penetrate into the sealing gap. As a result, the lubricants can improve the tribological properties and thereby reduce the wear. In the case of dynamic seals with lubricants, a challenge is presented of matching the sealing element, the sealing body and the lubricant to one another such that good sealing, good tribological properties and low wear are achieved all at the same time. Practically, it is very difficult or even impossible to completely prevent or at least minimize the abrasion of both the sealing element and the sealing body in a specific sealing system which is exposed to high loads. Sealing systems with lubricants behave differently from dry systems.

In order to solve the problem of abrasion, EP 2 291 439 B1 proposes to furnish elastomeric sealing elements with a plasma coating consisting substantially of carbon, oxygen, silicon, hydrogen and optionally fluorine. The silicon and oxygen contents are relatively high. The coating is therefore glass-like and has a relatively high hardness. The coated sealing element therefore has a high abrasion resistance at the surface, while the flexibility of the material desired for sealing applications is to be maintained in the interior. It is disadvantageous, however, that such hard coatings generally cause a high degree of wear of the sealing body (shaft shrinkage). In practical applications, shaft shrinkage is generally more problematic than wear of the sealing elements since the manufacture and the exchange of machine parts is often more complex in comparison. Compatibility with various lubricants is also not always given. Especially at high loads, the stability of such sealing systems is therefore in need of improvement and they are unsuitable for many applications. Moreover, when using very hard coatings, there is a risk of the sealing element losing its sealing effect.

Methods of plasma-assisted chemical or physical vapor deposition (CVD or PVD) for providing elastomeric substrates with hard plasma coatings consisting almost entirely of carbon are also known in prior art. Because of their hardness and structure, such coatings are referred to as "diamond-like carbon" (DLC). An overview of such methods and products is given in Martinez-Martinez, De Hosson, 2014, Surface and Coating Technology 258, 677-690. However, such coated articles are not suited, or are suited only to a limited extent, for dynamic sealing applications because in practice relatively strong abrasion and wear of the sealing bodies (shaft shrinkage) is caused due to the high hardness. Such abrasion of the sealing body can be problematic because it is usually a machine part in practice. The functioning of the machine can be impaired by the abrasion. The exchange of machine parts, such as shafts, is generally significantly more complex and expensive than the exchange of sealing elements, such as sealing rings. The wettability of such products with lubricants is also often inadequate. As a result, tribological properties, wear and abrasion are in need of improvement. Furthermore, there is no indication in literature that these coating systems are also suitable for use on sealing bodies since the issue of obtaining the sealing effect has not been addressed.

The tribological properties of DLC-coated elastomers in dry sealing systems are described, for example, in Thirumalai, 2016, Surface and Coating Technology 302, 244-254. In this case, significant wear of various coated substrates was observed because of the friction. Dynamic seals with lubricants were not investigated.

DE 10 2012 010 603B4 relates to sealing elements with plasma coatings for dynamic seals in the presence of lubricants. When used in lubricated sealing systems, an unwanted shaft shrinkage is obtained at the sealing body even though it is significantly reduced in comparison to uncoated sealing elements. The tribological properties are also still in need of improvement. The coatings have surface energies greater than 50 mN/m. Since the surface energy is a measure of wettability, compatibility with many lubricants is likewise in need of improvement.

The dissertation of Michael Lubwama, "*Tribological behaviour of DLC and Si-DLC films deposited on nitrile rubber for handpump piston seals,*" 2013, Dublin City University, relates to DLC coatings on elastomeric nitrile rubber sealing elements comprising only a small amount of silicon. The sealing elements are used as dry seals in order to seal wells against leakage of water. Applications with synthetic lubricants are not described.

Sealing elements and sealing systems remain in need of improvement. Specifically, there is a need for sealing systems configured to overcome the disadvantages described.

SUMMARY

In an embodiment, the present invention provides a method including using a sealing element to dynamically seal a sealing body in the presence of a lubricant. The sealing element has an elastomeric base body and a plasma coating. The coating includes the elements carbon, oxygen, silicon, and hydrogen. The coating has the following properties at least at the surface: the amount ratio C:Si (at %/at %) is >5, the amount ratio O:Si (at %/at %) is >3, and the surface energy is <50 mN/m. In an embodiment, the coating includes the element fluorine.

DETAILED DESCRIPTION

In an embodiment, the present invention provides sealing systems for dynamic seals which overcome the disadvantages described above. In an embodiment, the invention provides sealing systems that show advantageous properties and especially high stability in the presence of synthetic lubricants. The sealing systems exhibit good tribological properties in dynamic sealing applications, especially good frictional behavior.

In an embodiment, the present invention provides sealing systems which, in the presence of lubricants, exhibit at most little but preferably no abrasion of the sealing body (shaft shrinkage).

Sealing systems that are stable and efficient over long periods of time are provided.

In an embodiment, the invention provides efficient and stable sealing systems for use with polar lubricants, such as polyethers, e.g. polyalkylene glycols, polyesters or water-based lubricants, especially at relatively low temperatures, as in devices with oil sump temperatures below 80° C.

In an embodiment, the objectives are surprisingly achieved by uses, sealing systems, sealing elements and methods according to the claims. Further advantageous embodiments are disclosed in the description.

In an embodiment, the invention provides a sealing element for dynamically sealing a sealing body in the presence of a lubricant, the sealing element having an elastomeric base body and a plasma coating, wherein the coating comprises the elements carbon, oxygen, silicon, hydrogen and optionally fluorine, wherein the coating has the following properties at least at the surface:

the amount ratio (at %/at %) of C:Si is >5
the amount ratio (at %/at %) of O:Si is >3, and
the surface energy is <50 mN/m.

An embodiment of the invention relates to a sealing system (a seal) having a sealing element which comprises at least one sealing body. The sealing system is, for example, an assembly, such as a transmission. The sealing body is usually a machine part. The sealing element and the sealing body form an interface which is referred to as a sealing gap in sealing technology. The sealing system is a dynamic seal in which the sealing element and the sealing body move relative to one another when used as intended. Lubricants are preferably used in this case. These lubricants can penetrate into the sealing gap during use, whereby the tribological properties are improved. The term "tribology" is the science of friction, that is to say especially the science of calculating and measuring friction coefficients, wear and lubrication between interacting bodies and surfaces that are in motion with respect to one another.

In dynamic seals, such sealing systems substantially serve to ensure the interaction of different machine parts. Such sealing systems should have good tribological properties and exhibit low wear. In order to improve these properties, lubricants, such as oils and greases, are used on a regular basis. In addition, the lubricants can also serve to seal the sealing systems against fluids.

The sealing element has an elastomeric base body as a substrate and a plasma coating applied thereto. The coating is preferably applied directly to the base body. However, there may also be a further intermediate layer, for example in order to improve adhesion. The elastomeric base body preferably has or consists of an elastomeric polymer. The base body can be completely or partially coated in this case. The plasma coating is present at least on the part of the base body which forms the sealing gap in the sealing system.

The base body is provided with a plasma coating. The plasma coating is preferably produced by a plasma-assisted chemical vapor deposition (PE-CVD) method. In this case, the base body is placed in a PE-CVD device (plasma device) into which volatile, i.e. gaseous or vaporous, precursors (monomers) are introduced for coating. The precursor is chemically and physically altered in the plasma, and reactive intermediates and polymers which deposit on the surface of the base body are produced. Plasma coatings generally form a three-dimensional cross-linked structure. They are therefore often also referred to as plasma polymeric coatings. It is also possible to produce the coating by plasma-assisted physical vapor deposition (PVD).

The coating contains the elements carbon, oxygen, silicon, hydrogen and optionally fluorine. This means that these polymer molecules are composed of at least these elements. The coating preferably consists of carbon, oxygen, silicon, hydrogen and optionally fluorine. In one preferred embodiment, fluorine is present. In a further embodiment, nitrogen is present, for example in a proportion of up to 10 at % or up to 5 at %. In general, minor, unavoidable impurities of further elements may be present, for example in an amount of <5 at %, <2 at % or <1 at %. Such impurities arise, inter alia, when constituents of the base body transition into the plasma phase in reactive plasma and are incorporated or embedded into the coating. Typical impurities are, for example, metals, such as sodium or zinc.

According to an embodiment of the invention, the coatings a contain a relatively large proportion of carbon and only a small proportion of silicon. At least at the surface, the coating has an amount ratio (at %/at %) of C:Si of >5 and an amount ratio (at %/at %) of O:Si of >3.

Within the specification, amounts and proportions of the coating are specified in atomic percent (at %) unless expressly stated otherwise. The amounts at the surface of the coating can be determined by means of X-ray photoelectron spectroscopy (ESCA, electron spectroscopy for chemical analysis; also referred to as XPS, X-ray photoelectron spectroscopy). This method, which is customary in the prior art, determines the composition at the surface to a depth of a few nanometers. The composition is preferably measured at the surface in the upper 1 to 20 nm, especially in the upper 2 to 10 nm or, for example, in the upper 4 or 5 nm. The method allows for detecting all chemical elements except hydrogen.

In one preferred embodiment, the coating has an overall amount ratio (at %/at %) of C:Si>5 and an amount ratio (at %/at %) of O:Si>3. This means that the coating has these amount ratios on average. Preferably, the coating has such an amount ratio everywhere, or at least in regions which make up >80, >90 or >95% of the coating and/or of its cross-section. In one preferred embodiment, the composition of the coating is substantially homogeneous. Uniform coatings are produced by keeping the type and concentration of the gaseous precursors constant during the coating process. This does not rule out a brief pretreatment with another process gas for example at the beginning of the process, for example in order to clean and/or activate the surface of the base body and/or to improve adhesion to the base body at the interface. As is known to the person skilled in the art, the composition of the surface may vary somewhat especially at the interface to the base body because at the beginning of the plasma coating production process, a reaction with the base body and its activated constituents can also take place.

According to an embodiment of the invention, it is also possible for the coating to have various partial layers with different compositions and/or for the coating to have a gradient structure. Such non-homogeneous composition coatings can be produced by varying the type and/or concentration of the precursors during plasma coating.

The preferred compositions disclosed below can be adjusted either only at the surface of the coating or throughout the coating. According to an embodiment of the invention, it is important to adjust an advantageous composition at the surface of the coating where it is in contact with the lubricant and forms the sealing gap.

In one preferred embodiment, the amount ratio (at %/at %) C:Si is >10 or >20, preferably <80 or <70. Preferably, the amount ratio (at %/at %) C:Si is in the range from 5 to 80, preferably from 10 to 70 or from 25 to 70.

Preferably, the amount ratio (at %/at %) O:Si is >4 or ≥5.

Preferably, it is <20 or <15. It is especially in the range from 3 to 20, preferably from 4 to 15.

Preferably, the amount ratio (at %/at %) C:O is >3, particularly preferably >4. It is preferably <12, especially <10. The ratio is especially from 3 to 12, especially from 4 to 10.

In one preferred embodiment, the amount ratio (at %/at %) C:Si is from 10 to 80, the ratio O:Si is from 4 to 15, and the ratio C:O is from 3 to 12.

In one preferred embodiment, the proportion of Si is from 0.5 at % to 5 at %, preferably from 1 at % to 5 at % or from 1 at % to 4 at %. Surprisingly, it was found that even such a small proportion selectively incorporated into the polymeric coating can lead to a significant improvement in properties.

The coatings consist to a significant degree of carbon, preferably at a proportion of at least 50 at %, preferably more than 60 at %, preferably at a proportion from 50 at % to 95 at %, especially between more than 60 at % and 90 at %. The oxygen proportion is preferably from 5 at % to 25 at %, especially from 9 at % to 18 at %. The fluorine proportion may be up to 35 at %, especially up to 25 at %. If fluorine is present, the proportion is preferably between 5 at % and 35 at %, especially between 7 at % and 25 at %.

In a preferred embodiment, the coating has the following proportions (at %):

| | |
|---|---|
| Carbon: | 50% to 95%, preferably >60% to 90% |
| Oxygen: | 5% to 25%, preferably 9% to 18% |
| Silicon: | 0.5% to 5%, preferably 1% to 4% |
| Fluorine: | 0% to 35%, preferably 0% to 25% |

The coatings are characterized overall in that they contain only a relatively small proportion of silicon and oxygen. The coatings thereby differ from conventional coatings containing either substantially carbon and no silicon ("DLC coatings") or a relatively high proportion of silicon and oxygen of 20-25 at % and which are therefore glass-like ("$SiO_x$ coatings"). Coatings of the DLC class are characterized by high hardness. They can be produced, for example, from acetylene or methane as precursor. An overview of the production and properties of DLC coatings on elastomers is given in Martinez-Martinez (see above).

It was found that the properties of the coatings according to an embodiment of the invention in sealing applications differ significantly from those of carbon-rich coatings without silicon. The coatings according to an embodiment of the invention exhibit, for example, a different wettability and surface energy, which is important in the presence of lubricants. Although the coatings according to an embodiment of the invention have a relatively high carbon proportion, it can be assumed that the incorporation of silicon from precursors in small proportions in combination with oxygen results in a structure significantly different from that of known carbon-rich coatings.

Because of the relatively low proportion of silicon, inter alia, the coatings also differ significantly from known coatings which have a high proportion of silicon and oxygen. Such coatings are glass-like and have a relatively high hardness. They are described in EP 2 291 439 B1.

According to an embodiment of the invention, the coating is obtainable by a PECVD method in which a volatile, i.e. gaseous or vaporous, silicon precursor is used. In PECVD methods, the composition of the coating is adjusted by the selection and amounts of gaseous precursors. At least one precursor containing silicon is used. A compound consisting of silicon, carbon and hydrogen is particularly preferably used. This is especially an alkylsilane, preferably a tetraalkylsilane, particularly preferably tetramethylsilane (TMS).

In general, preference is given to precursors which contain at least silicon, carbon and/or oxygen. In order to achieve a low silicon proportion, a further precursor which contains no silicon and which is especially a carbon precursor is preferably used according to an embodiment of the invention. In particular used is at least one compound consisting of carbon and hydrogen, particularly preferably methane, ethylene or acetylene (ethine, $C_2H_2$). In particular, a mixture of acetylene and TMS is used. In order to obtain the required low silicon proportion, the compound which does not contain silicon is usually used in significant excess, for example at a weight ratio of at least 10:1. The exact concentrations and conditions are adjusted with respect to the particular compounds, the plasma device, and the desired coating composition.

It is known in the prior art that constituents of the base body can also be activated in the reactive plasma. These constituents can be released as reactive compounds into the gas phase and merge into the coating. This phenomenon occurs primarily at the beginning of the process when the surface of the base body is still uncoated and hence unprotected. Therefore, it is often observed in practice that a plasma coating has a somewhat different composition especially in the boundary region to the substrate. However, this is unimportant according to an embodiment of the invention as it is crucial for the coating to have the desired advantageous composition at the surface.

The coating is applied to an elastomeric base body. The main constituent of the base body is at least one organic polymer which may also be a silicon organic or fluorine polymer. The polymer is an elastomer forming a three-dimensionally cross-linked matrix. The elastomer gives the base body elasticity and flexibility, which are advantageous during the assembly and intended application of the sealing elements.

Preferred elastomeric base bodies are selected from fluoroelastomers (FKM, FFKM), EPDM (ethylene propylene diene elastomer), nitrile butadiene elastomers (NBR), hydrogenated nitrile butadiene elastomers (HNBR). Silicones, NR (natural rubber), polyacrylate elastomers (ACM), CR (chloroprene elastomer), HR (isobutene isoprene elastomer), AU (polyester urethane), EU (polyether urethane), MQ (methylene silicone elastomer), VMQ (vinyl methyl silicone elastomer), PMQ (phenyl-methyl silicone elastomer), FMQ (fluoro-methyl silicone elastomer), FERM (tetrafluoroethylene propylene elastomer), or mixtures of such elastomers. In one preferred embodiment of the invention, the elastomeric base body comprises at least one polymer selected from fluoroelastomers (FKM, FFKM), EPDM (ethylene propylene diene elastomer), nitrile butadiene elastomers (NBR) and hydrogenated nitrile butadiene elastomers (HNBR).

The base body preferably consists of at least 40 wt. %, at least 50 wt. % or at least 60 wt. % of at least one such polymer. In this case, the base body may contain customary additives, such as fillers, which may be organic or inorganic, dyes, stabilizers or plasticizers. Elastomers for sealing applications often contain fillers in order to improve hardness and stability.

In one preferred embodiment, the elastomeric base body is a fluoroelastomer. This generally refers to organic polymers containing fluorine. Preferably, the fluoroelastomer is a fluoro rubber (FKM) or a perfluoro rubber (FFKM). Fluoro rubbers (FKM) are produced by polymerization using vinylidene (di)fluoride (VDF), in which case other monomers, such as hexafluoropropylene (HFP) or tetrafluoroethylene (TFE), can additionally be used. Suitable FKMs are, for example, copolymers of vinylidene fluoride (VDF) and hexafluoropropylene (HFP) and terpolymers of VDF, HFP and tetrafluoroethylene (TFE). Particularly preferred are FKMs according to the definition of DIN ISO 1629 or ASTM D1418. Further suitable fluorinated elastomers are tetrafluoroethylene/propylene rubbers (FEPM) and fluorinated silicone rubber. In one preferred embodiment, the fluoroelastomer is cross-linked. Such cross-linked fluoroelastomers and their production are described, for example, in EP 1 953 190 B1.

In one preferred embodiment, the fluoroelastomer consists substantially of carbon and fluorine. In this case, it is possible for a small proportion to also consist of other elements, for example because additives which do not consist of fluorine and carbon, such as cross-linkers, are used in the polymerization. In preferred embodiments, the fluoroelastomer therefore consists of more than 90 wt. %, of more than 95 wt. % or of more than 98 wt. % of carbon and fluorine.

Preferably, the base body and/or the sealing element is/are a sealing ring, a rotary seal or a cassette seal. The sealing ring is especially a shaft sealing ring. Preferred sealing elements for dynamic seals are, for example, mechanical seals, radial shaft sealing rings, labyrinth shaft seals, rod seals, O-rings or piston rings. Such sealing elements seal machine housings against the surroundings at exiting elements, such as shafts or push rods. In a particularly preferred embodiment, the sealing element is a radial shaft sealing ring (RWDR). Radial shaft sealing rings are especially those defined in DIN3760. In one preferred embodiment, the sealing ring is an axial shaft sealing ring. In dynamic sealing applications, such sealing rings are highly exposed to strong forces which in combination with lubricants can lead to high wear of the sealing elements and to high shaft shrinkage.

The elastomeric base body is at least partially provided with a coating. In one embodiment of the invention, the elastomeric base body is completely provided with the coating. In a preferred embodiment, only portions of the base body are coated. The coated portions can make up, for example, 5 to 90%, especially 10 to 60%, of the surface of the base body. The decisive factor in this case is that the sealing gap, the contact surface to the sealing body and/or preferably also the adjoining regions of the base body are coated.

The coating preferably has a layer thickness in the nanometer range. For example, the layer thickness is between 5 and 3000 nm, especially between 100 and 1500 nm.

The coating has a relatively low surface energy of <50 mN/m, preferably <45 mN/m or <40 mN/m. The surface energy is preferably >20 mN/m, especially >25 mN/m or >30 mN/m. It is preferred for the surface energy to be in the range of 20 to 50 mN/m, especially in the range of 25 to 45 mN/m or 30 to 40 mN/m.

The surface energy (surface tension) is the total potential energy of the molecules located at or near the surface of a solid. In a solid, attractive forces act between the molecules which hold the solid together. These forces do not act on molecules at the surface from all sides but only from the inside. This results in a tensile force acting inwardly on molecules located at the surface. Work is therefore required to bring a molecule from the inside to the surface, and molecules at the surface have a corresponding potential energy. The surface energy is a characteristic value for the interaction between the surface of a condensed phase (solid or liquid) and its environment. It is specified in mN/m. The surface energy is a criterion for the wettability of a material. It can be increased by various plasma methods. The surface energies of solids range from less than 20 mN/m (e.g. PTFE) to several thousand mN/m (metals, diamond).

The surface energy of a coating can be influenced in a targeted manner by various measures during the production in the plasma. For example, the surface energy is influenced by the change in the proportion of oxygen-containing gases, the selected total gas quantity, the power or the reactivation of the surface, for example by varying the constituents in the plasma. A suitable way to increase the surface energy is to use process gases containing polar atoms, such as nitrogen or oxygen. According to an embodiment of the invention, the relatively low surface energy of <50 mN/m can be obtained, for example, if the coating has a relatively small proportion of silicon, a relatively high proportion of carbon and a relatively low proportion of oxygen.

The surface energy is measured indirectly via the contact angle which is formed between the solid and a liquid having a known surface tension at the phase boundary. Young's equation describes the relationship between the contact angle, the surface tension of the liquid, the interfacial tension between the two phases, and the surface energy of the solid. According to an embodiment of the invention, the surface energy is measured according to the static contact angle measurement method with water and diiodomethane as polar or non-polar liquid. The contact angle measurements are evaluated according to the equation of Owens and Wendt. DIN 55660-2 (December 2011; Paints and varnishes—Wettability—Part 2: Determination of the free surface energy of solid surfaces by measuring the contact angle) is particularly suitable for the determination.

The sealing element adjoins a sealing body. The sealing body is especially a machine part customary for sealing applications, for example a shaft. Such sealing bodies are often comprised of metal, for example steel. It is known in the field of sealing technology that shaft shrinkage, i.e. the abrasion of the sealing body, which can lead to leakage of the entire system or destruction of the sealing body, constitutes a great practical problem. Abrasion is caused by the sealing elements generally also having a relatively high hardness in order not to be abraded too much or destroyed themselves. In the prior art, the hardness of elastomeric sealing elements is regularly increased by incorporating fillers. The term "leakage" refers especially to the unwanted escape of the lubricant from the sealing system.

The use according to an embodiment of the invention takes place in the presence of a lubricant. Materials which reduce friction or wear in a sealing system are referred to as lubricants. In this case, the sealing element is wetted by the lubricant in the region of the sealing gap, wherein wetting takes place especially on the so-called oil side. The lubricant serves primarily to reduce friction and wear and thereby to lengthen the service life of the sealing system.

Lubricants are liquid or lubricating under operating conditions. They are generally organic substances or mixtures of substances. Customary lubricants are, for example, greases or oils. The lubricant is preferably selected from organic lubricating oils, especially synthetic lubricating oils. Because of the low surface energy, the sealing element according to an embodiment of the invention is suitable for sealing in the presence of both polar and oleophilic lubricants. The lubricant may be generally polar or oleophilic (miscible with oils). Suitable lubricants contain or are, for example, polyethers, polyesters, water-based lubricants, silicone oils or polyalphaolefins. Water-based lubricants contain water and organic compounds, such as polyethers, polyesters and/or surfactants, preferably in a proportion of 5 wt. % or more. They are described, for example, in EP 2 473 587 B1.

The use of polar lubricating oils is particularly preferred. Preferably, the polarity is higher than that of mineral oils. The lubricant is, in particular, preferably hydrophilic, i.e. miscible or partially miscible with water. Polar lubricating oils have polar groups, especially oxygen-containing groups, such as hydroxyl groups, ether groups or ester groups. The lubricant is preferably a polyether, polyester or a mixture thereof.

The lubricants polyalkylene glycols are particularly preferred. They are produced by polymerization of alkylene oxide units, usually ethylene oxide or propylene oxide units or combinations thereof, initiated by the attachment to an alcohol. In this case, the proportion of ethylene oxide determines the solubility in water. A polypropylene glycol is particularly preferably used. Various polyalkylene glycols are commercially available under the brand name "polyglycol." Polyalkylene glycols have high temperature resistances and a high potential for minimizing friction in tooth systems. Suitable polyglycol oils are commercially available, for example under the brand name Klübersynth GH 6, or Klübersynth UH1 6-460, manufactured by Klüber Lubrication, Germany. Polar lubricating oils, especially polyalkylene glycols, have been found to be particularly compatible with the sealing systems according to an embodiment of the invention.

In a preferred embodiment, the contact angle of the coating to the lubricant is less than 50°, less than 40° or less than 30°, preferably from 10° to less than 50°, still more preferably between 15° and 30°. At such relatively low contact angles, the coating can be wetted well with the lubricant. It has been found that polar lubricating oils and especially polyalkylene glycols have such contact angles with the sealing elements according to an embodiment of the invention, which results in an efficient, wear-resistant sealing system. The contact angle is preferably determined at room temperature in the equilibrium state pursuant to DIN 55660-2 (December 2011).

The lubricants have a surface tension of 10-70 mN/m, preferably 15-60 mN/m or 20-40 mN/m. Determination of the surface tension by the hanging drop method pursuant to DIN 55660-3 (December 2011).

The system according to an embodiment of the invention is particularly suitable when using lubricants that have a relatively high viscosity. In a preferred embodiment, the lubricant therefore has a kinematic viscosity of >150 mm$^2$/s, preferably 250 mm$^2$/s or >400 mm$^2$/s. The kinematic viscosity is preferably measured at 40° C. according to ISO 3104/ASTM D445.

Use preferably takes place at an oil sump temperature <80° C., especially <60° C. or <40° C. This refers to the temperature at which the oil in the overall device is merged and stored at the lowest point (oil pan, oil sump). In the dynamic sealing system itself, significantly higher temperatures caused by the frictional heat of the components can be present locally.

Use with such high-viscosity lubricants and/or at relatively low temperatures <80° C. is particularly advantageous. According to an embodiment of the invention, it was found that especially under such conditions, especially when using synthetic hydrophilic oils, such as polyalkylene glycols, a particularly stable sealing system is obtained which is extremely low in wear. This applies especially in combination with sealing elements based on fluoroelastomers. For such sealing systems, it was found that shaft shrinkage can not only be reduced but even be completely prevented. This is particularly advantageous since, under comparable conditions, relatively strong wear of the sealing element and/or a relatively strong shaft shrinkage of the sealing body is generally observed in the prior art.

According to an embodiment of the invention, it was surprisingly found that the sealing element has a particularly advantageous combination of properties in a dynamic sealing system. In the prior art, it is generally assumed that sealing elements for dynamic sealing applications must be relatively hard in order to prevent damage to the sealing element by abrasion. It was thus proposed in EP 2 291 439 B1, for example, to provide sealing elements with glass-like coatings having a high silicon and oxygen proportion. Moreover, hard coatings with a high carbon proportion (DLC) have been proposed in the prior art. However, the disadvantage of such coatings is that, although abrasion of the sealing element can be reduced in practice, the sealing body itself is impaired by abrasion instead. An undesired shaft shrinkage at the sealing body is observed in shaft applications as a result.

The sealing system according to an embodiment of the invention has excellent tribological properties. At the same time, abrasion of the sealing body can be greatly reduced and often even completely prevented. The sealing system is particularly suitable for dynamic sealing applications in the presence of synthetic lubricants. In the case of dynamic seals of shafts, shaft shrinkage can thus be largely or even completely avoided.

The invention also relates to a sealing system (a seal) comprising the sealing element, a sealing body, an intermediate dynamic sealing gap and optionally a lubricant. The sealing system is preferably a dynamic seal.

Figure 1A:
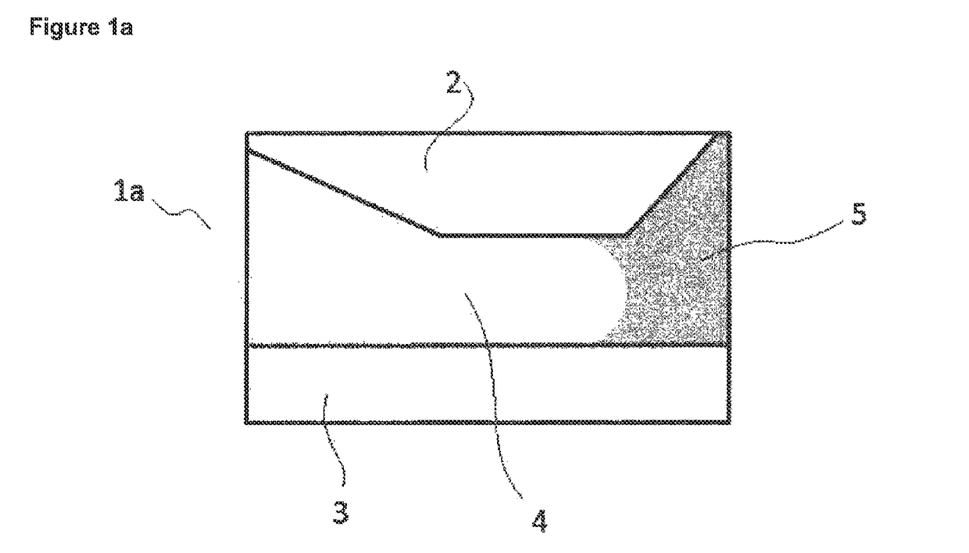
FIG. 1a schematically shows an exemplary sealing system.
Figure 1B:
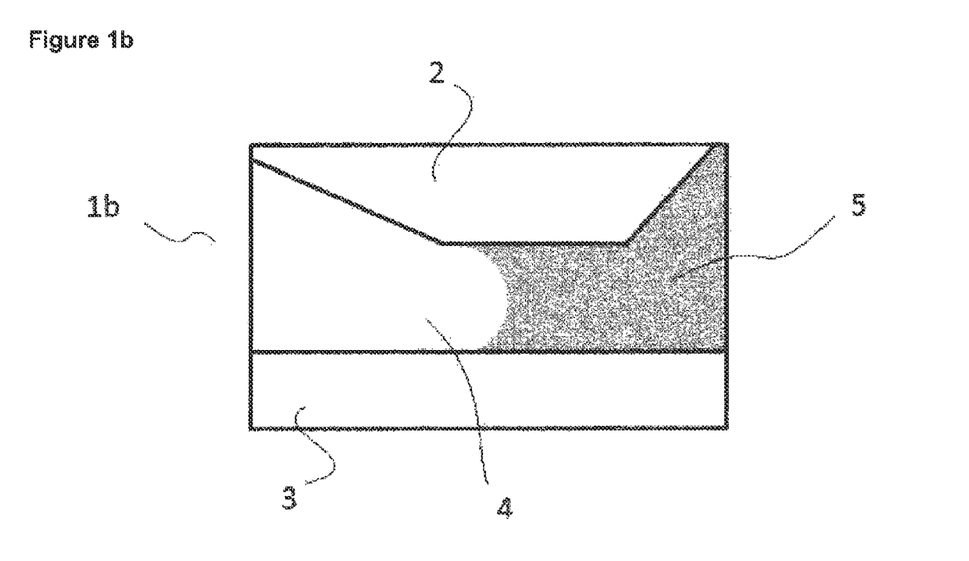
FIG. 1b schematically shows an exemplary sealing system.

FIG. 1 schematically and by way of example shows sealing systems 1a, 1b composed of a sealing element 2 and a sealing body 3, which form a sealing gap 4, and a lubricant 5. On the left side, a conventional system 1a is shown in which the lubricant 5 does not completely fill the sealing gap 4 because wettability is insufficient. With the coating according to an embodiment of the invention, a sealing system 1b can be obtained, as shown on the right-hand side, in which the sealing gap 4 is completely filled with lubricant 5, i.e. in which the sealing element 2 and the sealing body 3 are completely wetted in the sealing gap 4.

The invention also relates to a device comprising a system to be sealed which contains the dynamic sealing system (the seal). In a preferred embodiment, the device is a transmission, a pump, a motor or a motor vehicle.

The invention also relates to a method for dynamically sealing a sealing body with a dynamic sealing system according to an embodiment of the invention, wherein the sealing body and the sealing element are dynamically moved relative to one another.

With the method according to an embodiment of the invention, a sealing system comprising the sealing body, the sealing element and the lubricant is provided. The sealing body and the sealing element are moved relative to one another. It was observed in this respect that the sealing system is stable over longer periods of time. In this case, it is not disadvantageous if slight abrasion of the sealing element occurs in the initial phase. A system is obtained which can be operated stably over a long period of time. It was found, for example, that slight abrasion of the sealing element may take place within less than 96 hours, while in a subsequent, longer phase of up to 1000 hours, there is no further significant abrasion. It was observed, moreover, that no wear of the shaft as a sealing body, i.e. no shaft shrinkage, was observed during the 1000-hour operation. The effect was particularly pronounced in the case of highly viscous lubricants and relatively low temperatures. Overall, a system is provided which stabilizes with increasing operating time and has permanently good tribological properties.

The invention also relates to a sealing element for dynamically sealing a sealing body in the presence of a lubricant, wherein the sealing element has an elastomeric base body made of a fluoroelastomer and a plasma coating, wherein the coating comprises the elements carbon, oxygen, silicon, hydrogen and optionally fluorine,
wherein the coating has the following properties at least at the surface:
the amount ratio (at %/at %) of C:Si is >5
the amount ratio (at %/at %) of O:Si is >3, and
the surface energy is <50 mN/m.

The sealing element can be further configured as generally described above. The sealing element having a base body made of a fluoroelastomer exhibits particularly advantageous properties in the system according to an embodiment of the invention, especially in combination with polar lubricants, such as polyalkylene glycols.

The invention also relates to a method for producing a sealing element according to an embodiment of the invention by plasma-assisted, preferably chemical, vapor deposition, comprising the steps of:

(a) introducing the elastomeric base body into the plasma device, (b) introducing at least one gaseous silicon precursor into the device, and (c) coating the base body in the device.

Plasma-assisted chemical vapor deposition is generally a process in which gaseous precursors, also referred to as monomers, excited by a plasma, deposit on a substrate as a cross-linked layer. The monomers in the gas phase are excited or fragmented, for example, by bombardment with electrons and/or high-energy ions. This produces free-radical or ionic molecular fragments which react with one another in the gas phase and are deposited on the surface of the substrate. The electrical discharge of the plasma and its intensive ion and electron bombardment continuously acts on the layer thus deposited so that further reactions are triggered and cross-linking of the deposited molecules is achieved. The plasma is preferably a low-pressure plasma, but an atmospheric pressure plasma may also be used. The coating of elastomers in plasma is known in the prior art and is disclosed, for example, in DE 10 2005 025 253 A1. Reference is hereby expressly made to the method disclosed therein.

According to an embodiment of the invention, the base body can be introduced initially in step (a) and the precursor(s) can then be added in step (b), or vice versa. The silicon precursor and optionally the further precursors are activated in the plasma. Actual polymerization can take place in the gas phase and/or in the coating. In step (c), the intermediates deposit on the base body. Methods for the production of carbon-containing coatings by means of plasma-assisted chemical or physical vapor deposition on elastomeric base bodies are generally known in the prior art and are described, for example, in EP 2291439 B1, Lubwama, 2003, or Martinez-Martinez and De Hosson, 2014 (see respectively above).

The uses, sealing elements, sealing systems, devices and methods according to an embodiment of the invention achieve the object underlying the invention. Dynamic sealing systems are provided which show a combination of advantageous properties. The sealing elements and sealing systems exhibit excellent tribological properties and especially a very good frictional behavior. They are, moreover, highly stable. Especially, there is at best little abrasion but often no abrasion at all of the sealing bodies. In this way, it is possible to, for example, completely prevent shaft shrinkage on the sealing body in practice. According to an embodiment of the invention, stable systems are provided which are stable over long periods of time, possibly after initial self-stabilization by slight abrasion of the sealing elements. This is highly advantageous for a plurality of practical applications, such as in motors, transmissions or pumps, where the overall service life depends on the wear of the individual parts.

FIG. 1 schematically and by way of example shows a sealing system composed of a sealing element, sealing body and lubricant.

Figure 2:
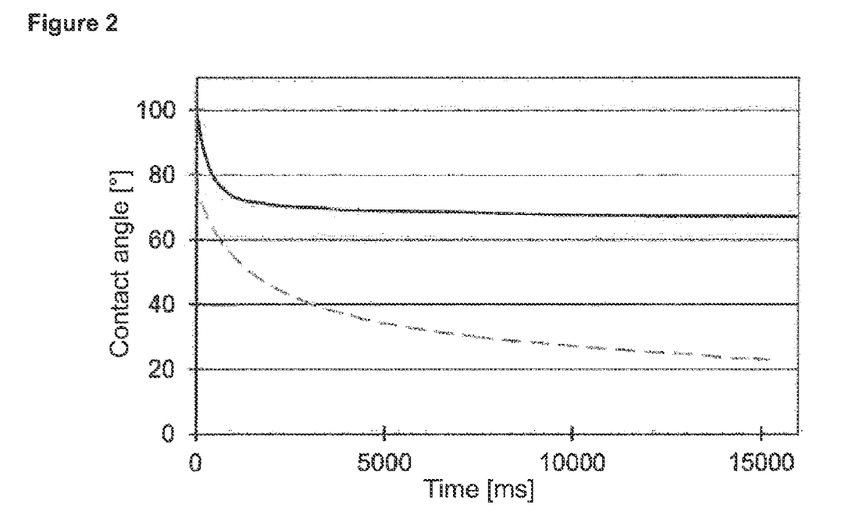
FIG. 2 shows the result of the contact angle measurement of a polyglycol lubricant on FKM with coating (dashed line) and without coating (solid line), according to an embodiment described in Example 11.

FIG. 2 shows the result of the contact angle measurement of a polyglycol lubricant on FKM with coating (dashed line) and without coating (solid line), as described in Example 11.

Figure 3:
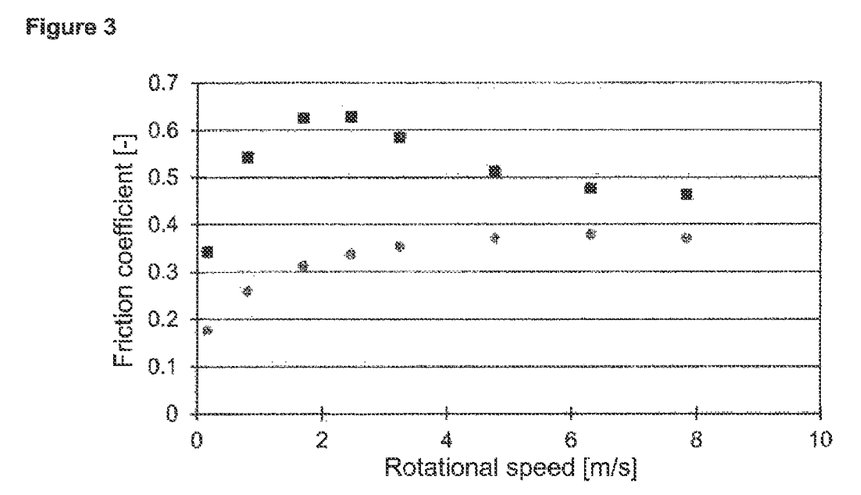
FIG. 3 shows the Stribeck curves of coated FKM (circles) and uncoated FKM (squares), according to an embodiment described in Example 12.

FIG. 3 shows the Stribeck curves of coated FKM (circles) and uncoated FKM (squares), as described in Example 12.

Examples 1 Through 9

Production and Characterization of Coatings

Various elastomers (see Table 1) are provided with a coating in a plasma-assisted chemical vapor deposition process. For this purpose, a low-pressure plasma system is used for an asymmetric, capacitively coupled radio-frequency discharge. The elastomeric bodies (substrates) are positioned in contact with the electrode. In this process, acetylene and optionally an oxygen-free alkylsilane compound are used as the carbon source and essential layer-forming precursor. The addition of further reactive gases, for example oxygen, argon, nitrogen, is also conceivable. These gases are put into the plasma state at process pressures of a few pascals through excitation with electromagnetic radiation, for example at radio frequency. The molecules are cleaved and condense on the surface of the base body as a carbon-rich layer when the alkylsilane having a low silicon proportion is used. For better bonding of the layer, the elastomers are first activated in a non-layer-forming plasma, for example composed of argon and/or oxygen. In this case, fragments of the substrate can transition from the surface into the plasma phase and be incorporated into the coating. The essential coating steps are listed in Table 2 by way of example. Layer 4 is an exception to the preceding explanation. In deviation thereto, these layers are not deposited in contact with the electrode and serve as a comparison to patent EP 2 291 439 B1.

TABLE 1

Sealing materials used

| Designation | Polymer | Cross-linking mechanism | Main filler |
| --- | --- | --- | --- |
| FKM I | Fluorocarbon rubber | Bisphenolic | Mineral fillers |
| EPDM I | Ethylene propylene diene rubber | Peroxidic | Soot |
| NBR I | Nitrile butyl rubber | Sulfur | Mineral fillers |

TABLE 2

Process parameters of coating processes

| Process parameters | Layer 1 (Comparative) | Layer 2 | Layer 3 | Layer 4 (Comparative) |
| --- | --- | --- | --- | --- |
| RF power [W] | 400 | 300 | 300 | 300 |
| Acetylene mass flow [sccm, $N_2$ calibrated] | 100 | 350 | 350 | |
| TMS mass flow [sccm, $N_2$ calibrated] | | 15 | 25 | |
| HMDSO mass flow [sccm, $N_2$ calibrated] | | | | 120 |
| $O_2$ mass flow [sccm, $N_2$ calibrated] | | 50 | 50 | 120 |

The coatings deposited in this way are characterized by means of X-ray photoelectron spectroscopy with regard to chemical composition (in the interface to air). In this case, however, the method only determines the layer chemistry of the uppermost nanometers and definitely not the composition of the entire coating. All samples were purified with ethanol prior to the measurement. The measured spectra are corrected to the C 1 s peak at 285.0 eV.

TABLE 3

Chemical composition of various surfaces

| Example | Substrate | Si [at %] | F [at %] | O [at %] | C [at %] | Other [at %] | O/Si | C/Si | C/O |
| --- | --- | --- | --- | --- | --- | --- | --- | --- | --- |
| 1 (V) | FKM I | 1.9 | 48.6 | 5.1 | 44.4 | | 2.7 | 23.4 | 8.7 |
| 1a (V) | FKM I with layer 1 | | 19.1 | 11.6 | 68.2 | 1.3 | | | 5.9 |
| 2 | FKM I with layer 2 | 2.3 | 10 | 14.5 | 73.3 | | 6.3 | 31.9 | 5.1 |
| 3 | FKM I with layer 3 | 1.0 | 21.2 | 11.7 | 65.8 | 0.4 | 11.7 | 65.8 | 5.6 |
| 4 (V) | FKM I with layer 4 | 16.7 | 10.5 | 35.5 | 35.2 | 2.1 | 2.1 | 2.1 | 0.99 |
| 5 (V) | EPDM I | 3.3 | | 6.6 | 90.1 | | 2 | 27.3 | 13.7 |
| 6 | EPDM I with layer 2 | 3.3 | | 16.2 | 80.7 | | 4.9 | 24.5 | 5 |
| 7 (V) | NBR I | 2.6 | | 6.5 | 88.2 | 2.7 | 2.5 | 33.9 | 13.6 |
| 8 | NBR I with layer 2 | 2.0 | | 10.4 | 87.6 | | 5.2 | 43.8 | 8.4 |
| 9 (V) | Stainless steel with layer 2 | 1.4 | | 17.4 | 79.9 | 1.3 | 12.4 | 57.1 | 4.6 |

The results are summarized in Table 3. Examples 2, 3, 6 and 8 are according to an embodiment of the invention. Examples 1, 5 and 7 (without coating), 1a (without Si precursor), 4 (with Si—O-rich coating) and 9 (on steel) marked with (V) are comparative examples. Example 4 with layer 4 corresponds to the layers described in EP 2 291 439 B1 since the binding energy of the Si 2p signal measured by means of XPS is shifted by about 1 eV to higher binding energies in comparison to trimethylsiloxy-terminated PDMS. The low content of Si in the uncoated Comparative Examples 1, 5 and 7 can be explained by the fact that the elastomers have additives, such as silicones or silica fillers. The comparison of the properties shows that the structure of the surfaces coated according to an embodiment of the invention is very different and that the advantageous effects with regard to tribological properties and shaft shrinkage are achieved only in case of the plasma coatings according to an embodiment of the invention (see examples below).

Example 10

Determination of Surface Energies and Contact Angles

Contact angle measurements are carried out on the lying drop in order to determine the surface energies. With the exception of the conditioned atmosphere, the procedure is carried out analogously to the DIN 55660-2 standard from December 2011. The measurements are carried out at 23-26° C. Water and diiodomethane are used as measuring liquids. The surface energy is calculated according to the Owens-Wendt method based on the contact angles resulting from the measurement. The total surface energy is composed of the polar and the disperse parts.

The contact angle measurements are performed one day, 7 and 30 days after the coating process. All surfaces were cleaned with ethanol prior to the measurement. Since the base body material is a multi-component system whose individual components tend to migrate to some extent, the measured values of the contact angles vary by up to 10° due to the material. The results are summarized in Table 4. Overall, the measurements show that the surface energies are relatively low so that the coatings can be wetted relatively well.

TABLE 4

Surface energies (in mN/m) of carbon-rich coatings on different elastomers.

| | | After 1 day | | | After 7 days | | | After 30 days | | |
|---|---|---|---|---|---|---|---|---|---|---|
| Example | Product | $\sigma_p$ | $\sigma_d$ | $\sigma_{tot}$ | $\sigma_p$ | $\sigma_d$ | $\sigma_{tot}$ | $\sigma_p$ | $\sigma_d$ | $\sigma_{tot}$ |
| 1 (V) | FKM I | 0.8 | 19.4 | 22.2 | 1.3 | 23.9 | 25.2 | 2.0 | 22.2 | 24.2 |
| 2 | FKM I with layer 2 | 4.4 | 36.4 | 40.8 | 2.7 | 29.7 | 32.4 | 2.5 | 28.4 | 30.9 |
| 5 (V) | EPDM I | 0.1 | 29.7 | 29.8 | 1.3 | 24.3 | 25.6 | 0.4 | 28.0 | 28.4 |
| 6 | EPDM I with layer 2 | 5.0 | 34.0 | 39.0 | 0.0 | 41.1 | 41.1 | 0.1 | 36.6 | 36.7 |
| 7 (V) | NBR I | 0.5 | 42.5 | 43.0 | 0.2 | 37.5 | 37.7 | 0.1 | 37.3 | 37.4 |
| 8 | NBR I with layer 2 | 0.3 | 40.0 | 40.3 | 1.4 | 39.6 | 41.0 | 0.1 | 41 | 41.1 |

The contact angle to a commercially available polyalkylene glycol oil of ISO viscosity class 460 (of the brand Klübersynth UH1 6-460; Klüber Lubrication, Germany) is measured on layer-2-coated and uncoated FKM I. FIG. 2 shows the result of the contact angle measurement on FKM with coating (dashed line) and without coating (solid line). As a result of the coating, wetting is significantly improved and the contact angle in equilibrium is reduced by about two thirds from about 68° to about 22%. The coatings are therefore particularly suitable in combination with polyalkylene glycol as lubricant.

Example 11

Frictional Behavior Without Lubricant

In order to characterize the frictional reduction of the coatings, coated and uncoated specimens are moved over a stainless-steel plate ($R_a$=1.062 μm) and the necessary force is recorded. For this purpose, three specimens are inserted into a special receptacle which allows a contact surface per specimen of approximately 6.5 mm² to the counter-rotating partner. The receptacle is placed with the specimens down onto the counter-rotating partner and weighted down with a mass of 1 kg. The counter-rotating partner is then moved at a speed of 150 mm/min and the force which has to be exerted in order to hold the receptacle in place is measured. The measurement is performed three times in succession; the mean values are summarized in Table 5. The results show that the frictional behavior of the elastomers is significantly improved by the coatings.

TABLE 5

Frictional forces of various surfaces

| From Ex. | Substrate | Force [N] |
|---|---|---|
| 1 (V) | FKM I | 12.4 |
| 2 | FKM I with layer 2 | 2.3 |
| 5 (V) | EPDM I | 10.9 |
| 6 | EPDM with layer 2 | 2.4 |
| 7 (V) | NBR I | 11.1 |
| 8 | NBR I with layer 2 | 2.5 |

Friction measurements are carried out analogously to the preceding description. However, a polished stainless-steel surface is used as the counter-rotating partner.

TABLE 6

Frictional forces of various coatings

| From Ex. | Substrate | Force [N] |
|---|---|---|
| 1 (V) | FKM I | 16.1 |
| 1a (V) | FKM I with layer 1 | 4.0 |

TABLE 6-continued

Frictional forces of various coatings

| From Ex. | Substrate | Force [N] |
|---|---|---|
| 2 | FKM I with layer 2 | 2.2 |
| 3 | FKM I with layer 3 | 2.3 |
| 4 (V) | FKM I with layer 4 | 9.5 |

The results are shown in Table 6. They show that the frictional behavior of the coated elastomers (Examples 2, 3) according to an embodiment of the invention is significantly better than in elastomers with coatings comprising no silicon (Example 1a) or coatings with high Si—O proportion (Example 4).

Example 12

Frictional Behavior with Lubricant

In order to describe the properties of the lubricated sealing system, comparative tests are carried out on a ring-on-disk test stand (see also M. Sommer, W. Haas: "A new approach on grease tribology in sealing technology: Influence of the thickener particles," *Tribology International*, volume 103, November 2016, pages 574-583). For this purpose, specimens of FKM I are used and tested in comparison in uncoated and layer-2-coated condition (pursuant to Examples 1 and 2). A polyalkylene glycol oil of ISO viscosity class 460 (Klübersynth UH1 6-460) is used as lubricant. The test setup is tempered to 60° C. FIG. 3 shows the results with coated FKM (circles) and uncoated FKM (squares). A significant reduction in friction due to the coating is also clearly observed in the lubricated sealing system. The effect of the coating becomes clear especially in the front region of the curves where mixed friction, solid-state friction and boundary friction occur. A visual inspection of the specimens after the examinations shows minimal wear in the uncoated specimens. No wear can be detected by visual methods in the coated specimens.

Example 13

Determination of Abrasion with Sealing Rings and Lubricant in the Short-Time Component Test Radial shaft sealing rings (RWDR) consisting of a metal insert which is sheathed with fluoroelastomer FKM I are provided with layer 2 as described in Example 2. In a typical short-term test, these components are examined for their application properties. Uncoated components are also tested for comparison. In this short-term test, a steel shaft (90Mn-CrV8, hardness 55-60 HRC $R_z$=1-5 µm, non-spinning) rotates in the sealing ring at 3000 rpm for 96 hours (p=0.3 bar). A polyalkylene glycol oil of ISO viscosity class 460 (Klübersynth UH1 6-460) at 45° C. oil sump temperature is used as lubricant. The running track width, which is a measure of the sealing edge's wear, is 0.2 to 0.4 mm for both variants after the end of the tests. However, the wear of the counter-rotating partner, the so-called shaft shrinkage, can be identified as a significant difference. It is between 7 and 35 pm in the uncoated components. No shaft shrinkage can be measured in the coated components. All measurements are measured by light microscopy. No leakage was detected in any of the sealing systems.

In a further test series, radial shaft sealing rings (RWDR of rubber FKM I) are provided with layers 1 to 4 and characterized in the 96-hour test described. The lubricant used is again a polyalkylene glycol oil of ISO viscosity class 460, this time at an oil sump temperature of 80° C. The results are summarized in Table 7.

TABLE 7

Surface energies and wear of differently coated RWDR after 96-hour component test

| Coating | Surface energy [mN/m] | Running track width [mm] | Shaft shrinkage [µm] |
|---|---|---|---|
| Layer 1 | 44.0 | 0.39-0.43 | 4.25 |
| Layer 2 | 33.6 | 0.22-0.28 | 0 |
| Layer 3 | 38.5 | 0.19-0.28 | 0 |
| Layer 4 | 49.2 | 0.39-0.49 | 5.89 |

The results show that, in the sealing systems according to an embodiment of the invention, shaft shrinkage of the sealing body can not only be reduced but even be completely prevented. In contrast, the comparative tests with the carbon-rich layer 1 having no silicon and with layer 4 (Si—O-rich) show a distinct shaft shrinkage, i.e. wear of the steel sealing body. No leakage was detected in any of the sealing systems.

Example 14

Determination of Abrasion with Sealing Rings and Lubricant in the Siemens Flender Test RWDR made of FKM I (75 FKM 585) are provided with a layer 2 as described in Example 2. Comparative tests are carried out with coated and uncoated components according to the protocol for the dynamic Siemens Flender test [FB 73 11 008 (status as per Jul. 30, 2015: Static and dynamic oil compatibility tests with Freudenberg shaft seals for release for use in FLENDER transmissions, Tables T 7300 https://cache.industry.siemens.com/dl/files/658/44231658/att_861254/v1/DE_5-2_RWDR-_und_O-Ringtest_Rev06_2015-07-30.pdf). A polyalkylene glycol oil of ISO viscosity class 460 (Klübersynth UH1 6-460) at 110° C. is used as lubricant.

After completion of the test series, the wear of the sealing edge for uncoated rings of 0.2 to 0.4 mm is in the same range as the wear of the sealing edge for coated rings of 0.1 to 0.3 mm. Shaft shrinkage in the tribological system with uncoated FKM ring is 30-40 µm. However, in the tribological system with coated rings, no shaft shrinkage can be detected. Leakage was also not detected in any of the sealing systems.

Example 15

Determination of Abrasion with Lubricated Sealing Rings in a Long-Term Test

RWDR made of FKM I are provided with a layer 2 as described in Example 2. The coated surfaces of a test series are additionally provided with a grease prior to testing. Comparative tests are now carried out with lubricated and unlubricated components (shaft: C45R, Rz—1-5 µm, non-spinning; test parameters: t=240 h, $T_{lubricant}$=70° C., p=0.25 bar). In this test, a steel shaft rotates in the sealing ring for a total of 240 h, alternately 20 h at 2000 revolutions per minute and 4 h at rest. A polyglycol oil of ISO viscosity class 220 at 70° C. oil sump temperature is used as lubricant.

After completion of the test series, the running track width for both lubricated and unlubricated seals is 0.1 to 0.2 mm. In all tribological systems (with lubricated or unlubricated rings), no shaft shrinkage can be detected again. This means that the good tribological properties of the sealing rings coated according to an embodiment of the invention are retained even with the additional use of lubricating greases. A significant shaft shrinkage occurs when using uncoated but greased RWDR. No leakage was detected in any of the sealing systems.

Disclosed is a method of use of a sealing element for dynamically sealing a sealing body in the presence of a lubricant. The sealing element has an elastomer main part and a plasma coating, and the coating has the elements carbon, oxygen, silicon, hydrogen, and optionally fluorine. The coating has at least the following properties on the surface: the material quantity ratio (at %/at %) of C:Si is >5, the material quantity ratio (at %/at %) of O:Si is >3, and the surface energy is <50 mN/m. The invention also relates to sealing systems, sealing methods, sealing elements, and methods for producing same.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method comprising:
    using a sealing element to dynamically seal a sealing body in the presence of a lubricant, the sealing element having an elastomeric base body and a plasma coating,
    wherein the coating comprises the elements carbon, oxygen, silicon, hydrogen,
    wherein the coating has the following properties at least at the surface:
        the amount ratio C:Si (at %/at %) is >5
        the amount ratio O:Si (at %/at %) is >3, and
        the surface energy is <50 mN/m.

2. The method according to claim 1, wherein the proportion of Si is from 0.5 at % to 5 at % at least at the surface of the coating, and/or wherein the proportion of C is >60 at % at least at the surface of the coating.

3. The method according to claim 1, wherein the amount ratio C:O is >3 (at %/at %) at least at the surface of the coating.

4. The method according to claim 1, wherein the amount ratio (at %/at %) of C:Si at least at the surface of the coating is from 10 to 80, the ratio O:Si is from 4 to 15 (at %/at %) and the ratio C:O is from 3 to 12 (at %/at %).

5. The method according to claim 1, wherein the coating is obtainable in a plasma coating process in which a gaseous silicon precursor is used.

6. The method according to claim 1, wherein the coating has the following proportions (in at %) at least at the surface:

| Carbon: | 50% to 95% |
| Oxygen: | 5% to 25% |
| Silicon: | 0.5% to 5% |
| Fluorine: | 0% to 35% |

7. The method according to claim 1, wherein the elastomeric base body is a fluoroelastomer.

8. The method according to claim 1, wherein the contact angle of the coating relative to the lubricant is from 10° to 50°.

9. The method according to claim 1, wherein the lubricant has a kinematic viscosity of >200 mm$^2$/s measured at 40° C., and/or
    wherein the lubricant is a polyether, especially a polyalkylene glycol, or a polyester, or a mixture thereof.

10. The method according to claim 1, wherein the use is carried out at an oil sump temperature <80° C.

11. The method according to claim 1, wherein the sealing element and/or the base body is a sealing ring.

12. A sealing system comprising a sealing element, a sealing body, and an intermediate dynamic sealing gap,
    wherein the sealing element has an elastomeric base body and a plasma coating,
    wherein the coating comprises the elements carbon, oxygen, silicon, hydrogen,
    wherein the coating has the following properties at least at the surface:
        the amount ratio C:Si (at %/at %) is >5
        the amount ratio O:Si (at %/at %) is >3, and
        the surface energy is <50 mN/m.

13. A device comprising a sealing system according to claim 12, especially in form of a transmission, a pump, a motor, or a motor vehicle.

14. A sealing element for dynamically sealing a sealing body in the presence of a lubricant, the sealing element having an elastomeric base body made of a fluoroelastomer and a plasma coating,
    wherein the coating comprises the elements carbon, oxygen, silicon, and hydrogen,
    wherein the coating has the following properties at least at the surface:
        the amount ratio C:Si (at %/at %) is >5
        the amount ratio O:Si (at %/at %) is >3, and
        the surface energy is <50 mN/m.

15. A method for producing the sealing element according to claim 14 by plasma-assisted vapor deposition, the method comprising the steps of:
    (a) introducing the elastomeric base body into the plasma device, (b) introducing at least one gaseous silicon precursor into the device, and
(c) coating the base body in the device.

16. The method according to claim 1, wherein the coating comprises the element fluorine.

17. The method according to claim 1, wherein the coating has the following proportions (in at %) at least at the surface:

| | |
|---|---|
| Carbon: | 60% to 90% |
| Oxygen: | 9% to 18% |
| Silicon: | 1% to 4% |
| Fluorine: | 0% to 25% |

18. The method according to claim 8, wherein the contact angle of the coating relative to the lubricant is from 15° to 30°.

19. The sealing system according to claim 12, further comprising a lubricant.

20. The sealing element according to claim 14, wherein the coating comprises the element fluorine.

* * * * *